US005847378A

United States Patent [19]

Goodwin, III

[11] Patent Number: 5,847,378

[45] Date of Patent: Dec. 8, 1998

[54] ELECTRONIC PRICE LABEL HAVING A TWO-PART OVERLAY ARRANGEMENT

[75] Inventor: John C. Goodwin, III, Suwanee, Ga.

[73] Assignee: NCR Corporation, Dayton, Ohio

[21] Appl. No.: 730,729

[22] Filed: Oct. 15, 1996

[51] Int. Cl.$^{6}$ .................................................. G06K 151/00

[52] U.S. Cl. ............................................ 235/383; 235/375

[58] Field of Search ...................................... 235/383, 375

[56] References Cited

U.S. PATENT DOCUMENTS

| | | | |
|---|---|---|---|
| 4,002,886 | 1/1977 | Sundelin . | |
| 4,500,880 | 2/1985 | Gomersall et al. | 340/825.35 |
| 5,172,314 | 12/1992 | Poland et al. | 364/401 |
| 5,751,257 | 5/1998 | Sutherland | 235/383 |

*Primary Examiner*—Harold Pitts
*Attorney, Agent, or Firm*—Paul W. Martin

[57] ABSTRACT

An electronic price label (EPL) which uses a two-part overlay arrangement to avoid stacking of permanent adhesive overlays. The EPL includes a housing having a front surface containing an aperture exposing the electronic display. A first record member is substantially permanently attached to the front surface of the electronic display. The first record member contains information that is substantially permanent, and includes legends for the electronic display. A second record member is removably attached to the first record member. The second record member contains product information that is likely to change.

23 Claims, 2 Drawing Sheets

ELECTRONIC PRICE LABEL HAVING A TWO-PART OVERLAY ARRANGEMENT

BACKGROUND OF THE INVENTION

The present invention relates to electronic signage, and more specifically to an electronic price label (EPL) having a two-part overlay arrangement.

EPL systems typically include a plurality of EPLs for each merchandise item in a store. EPLs typically display the price of corresponding merchandise items on store shelves and are typically attached to a rail along the leading edge of the shelves. EPLs may include a semi-transparent LCD. A store may contain thousands of EPLs to display the prices of the merchandise items. The EPLs are coupled to a central server from where information about the EPLs is typically maintained in an EPL data file. Price information displayed by the EPLs is obtained from the PLU file.

To keep the cost of EPLs to a minimum, store owners use EPLs to display minimal information, including price and price per unit. To display other information that changes infrequently, store owners attach overlays that display information that changes infrequently. These overlays are made of paper or plastic and contain information such as item descriptions, bar code labels, messages to the customer, package sizes, reorder codes, and other information. The overlays are coated with an adhesive material and applied to the front surfaces of the EPLs.

Unfortunately, when an EPL is associated with a different item, a new overlay must be printed and attached to the EPL. Eventually, the number of overlays attached to an EPL builds up. Removal of old overlays is time-consuming, costly, and wasteful. Also, attachment of new overlays may be difficult and result in damage to overlays and resulting waste.

Therefore, it would be desirable to provide an EPL that has a permanent or semi-permanent (tougher adhesive) overlay for displaying information that rarely changes, and an easily-removable temporary label for displaying information specific to an item.

SUMMARY OF THE INVENTION

In accordance with the teachings of the present invention, an electronic price label (EPL) having a two-part overlay arrangement is provided.

The EPL includes an electronic display for displaying price information, a housing having a front surface containing an aperture exposing the electronic display, a first record member substantially permanently attached to the front surface of the electronic display, and a second record member which is removably attached to the first record member.

The first record member contains substantially permanent information, such as legends for information displayed by the electronic display and a name of a store containing the EPL. The first record member occupies substantially all of the front surface around the aperture.

The second record member contains information that changes more often, such as product information, including a product name, bar code label, or inventory number. The second record member may also contain promotional messages.

It is accordingly an object of the present invention to provide an EPL having a two-part overlay arrangement.

It is another object of the present invention to provide an EPL having a two-part overlay arrangement, including a permanent overlay and a temporary overlay.

It is another object of the present invention to provide an overlay arrangement for an EPL that minimizes paper waste and is easy to install.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
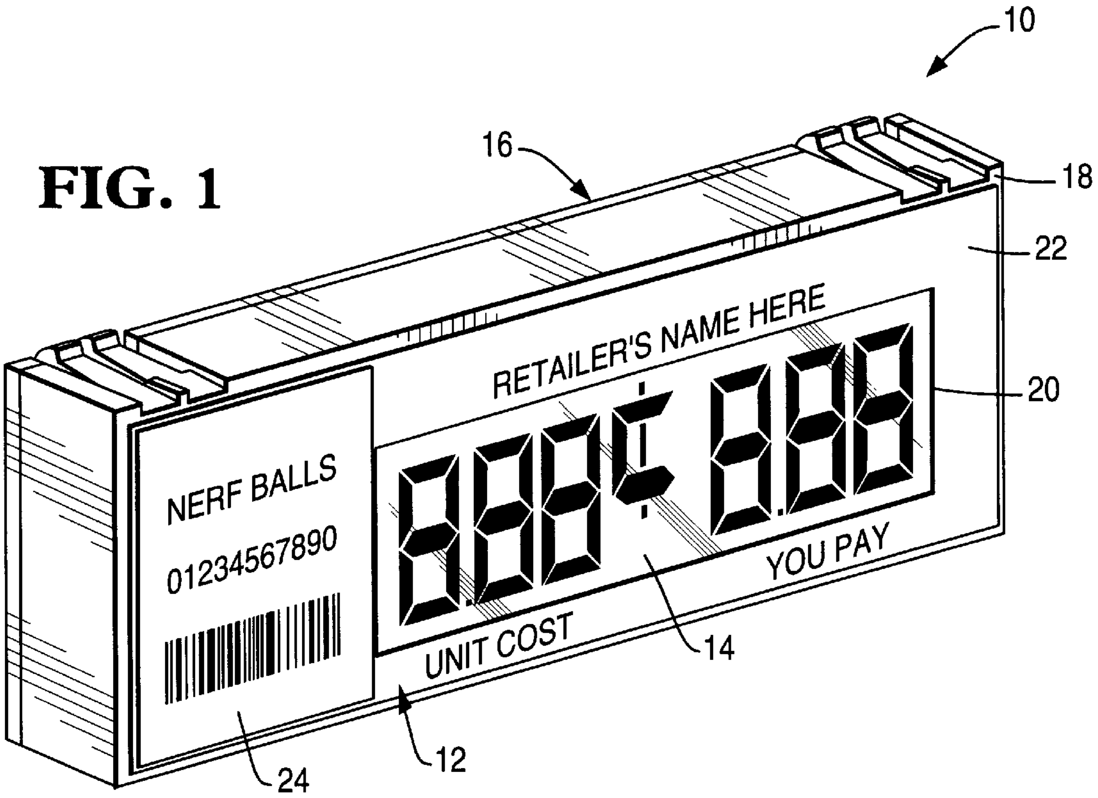
FIG. 1 is a perspective view of a first embodiment of the EPL and overlay arrangement of the present invention.
Figure 2:
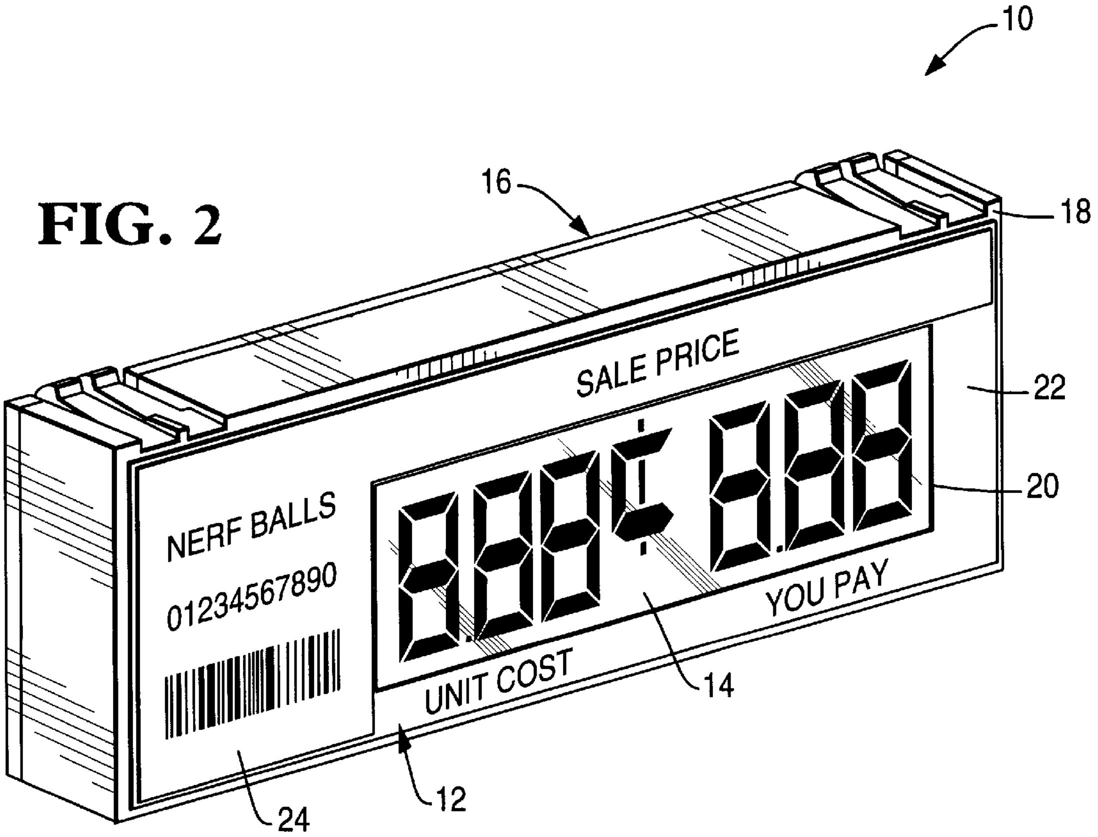
FIG. 2 is a perspective view of a second embodiment of the EPL and overlay arrangement of the present invention.

With reference to FIGS. 1 and 2, an electronic price label (EPL) 10 and two-part overlay arrangement 12 is shown.

EPL 10 is any suitable electronic price label. EPL 10 includes liquid crystal display (LCD) 14 and housing 16.

LCD 14 displays price information and other information that changes frequently.

Housing 16 has a front surface 18 containing aperture 20 through which LCD 14 is visible.

Two-part overlay arrangement 12 includes a first overlay 22 and a second overlay 24.

Overlay 22 is made of paper or plastic and is printed with information that is not likely to change, such as a store name, legends for price information displayed by LCD 14, and other information helpful to a customer.

Since overlay 22 is not intended to be removed, it has a strong adhesive backing. Such strong adhesives may include a permanent or semi-permanent adhesive. A permanent adhesive is one which would cause overlay 22 to tear if removed. A semi-permanent adhesive is defined as one which has a moderate initial tack and up to six months clear removability. One example of a semi-permanent adhesive backing is a clear acrylic adhesive sold by NCR Corporation as NCR Model No. 55.

In a typical store environment, overlays like overlay 22 are stacked or placed on top of each other, rather than removed, when new overlays are necessary. With the two-part arrangement 12 of the present invention, stacking is not necessary.

Overlay 24 is also made of paper or plastic and is printed with information that may change more frequently, but less frequently than pricing information. Such information is not displayed by LCD 14 in order to keep the cost of LCD 14 to a minimum. One example of this type of information is product name, product identification number, and product bar code. This information would normally be located on a single overlay, which would eventually lead to the piling discussed above.

Overlay 24 has a weak adhesive backing which allows it to be easily removed and replaced without damaging overlay 22 or overlay 24. Such weak adhesives include removable adhesives. A removable adhesive is defined as one which has ultra repositionability and residue free removability from most substrates. One example of a removable adhesive is an acrylic adhesive sold by NCR Corporation as NCR Model No. 09.

Instead of a weak adhesive, a Velcro® attachment system may be employed. Such a system would require that a pad of loops or hooks be attached to overlay 22 and a corresponding pad of loops or hooks be attached to overlay 24. Also, mechanical fasteners may be employed instead of the weal adhesive. Such fasteners may include clips, hooks, or frames.

Replacement may occur when an EPL is re-assigned to a different product, or when an overlay 24 containing a promotional message is replaced with one without a promotional message.

Overlay 24 occupies an area of overlay 22 that depends upon the size of front surface 18 and the amount of permanent information printed on overlay 22. In FIG. 1, overlay 24 only occupies a rectangular area to the left of LCD 14. In FIG. 2, overlay 24 additionally occupies an area above LCD 14. Area of overlay 22 to the left of aperture 20 is typically blank, without printed information. However, FIG. 2 illustrates that overlay 24 may overlap printed information on overlay 22 in some cases. Here, a promotional message on overlay 24 covers the retailer's name on overlay 22.

Figure 3:
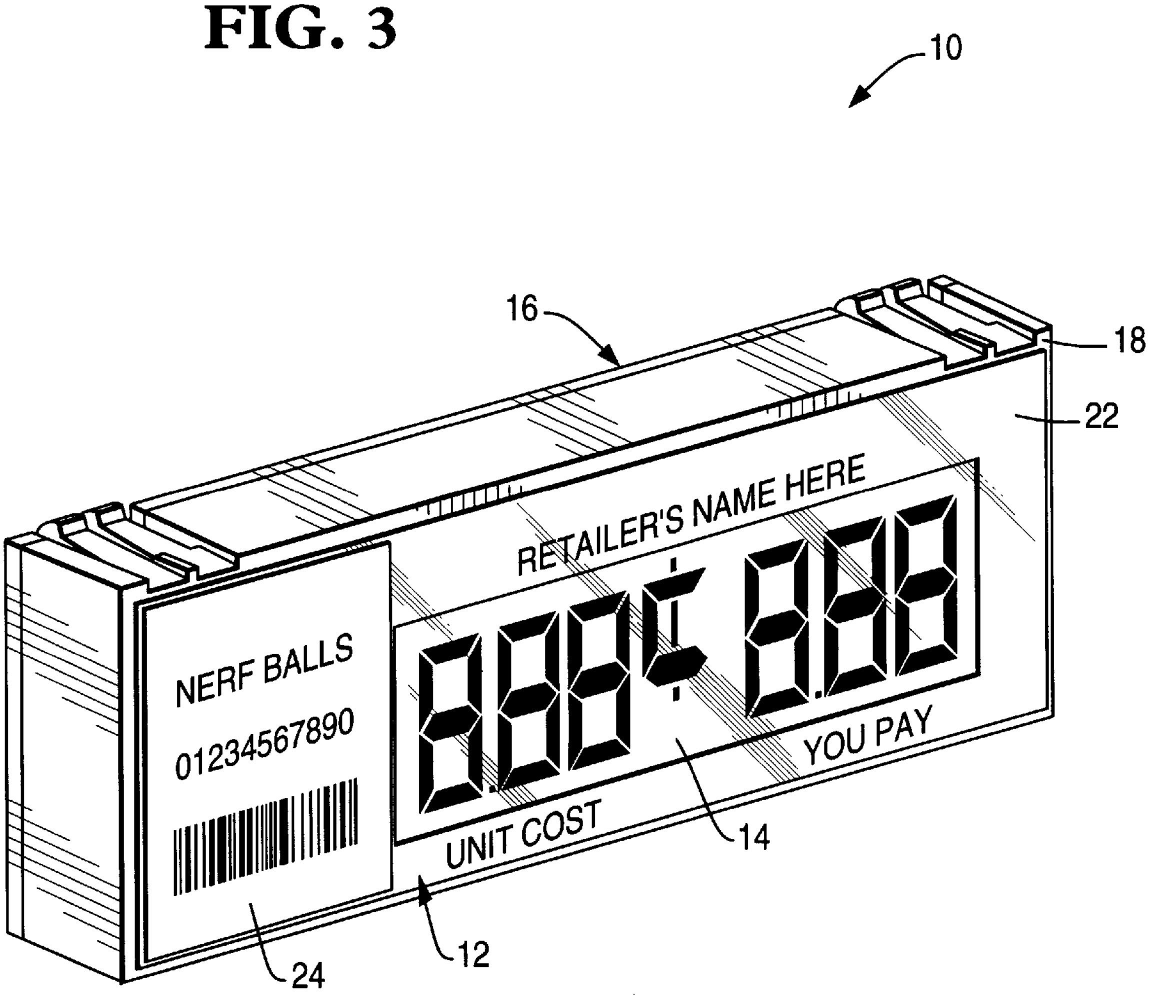
FIG. 3 is a perspective view of a third embodiment of the EPL and overlay arrangement of the present invention.

With reference to FIG. 3, overlay 22 in this embodiment is a transparent plastic. Overlay 22 may be uncolored or may have one or more colors for promotional, store identification, or other purposes.

Since it is transparent, overlay 22 does not require an aperture 20. Without an aperture, overlay 22 can also serve to protect LCD 14 from scratching and give LCD 14 a colored appearance. Overlay 22 may of course have an aperture 20 if desired.

Overlay 24 may have any of the shapes shown in FIGS. 1 and 2, and be attached in a similar manner.

Although the present invention has been described with particular reference to certain preferred embodiments thereof, variations and modifications of the present invention can be effected within the spirit and scope of the following claims.

What is claimed is:

1. An electronic price label (EPL) comprising:

an electronic display for displaying price information;

a housing having a front surface containing an aperture exposing the electronic display;

a first record member substantially permanently attached to the front surface of the electronic display using a first attachment device for displaying first information; and a second record member which is removably attached to the first record member using a second attachment device different than the first attachment device for displaying second information simultaneously with but different than the first information;

wherein the second record member leaves at least a portion of the first information of the first record member exposed when the second record member is attached to the first record member.

2. The EPL as recited in claim 1, wherein the first information of the first record member includes substantially permanent information.

3. The EPL as recited in claim 2, wherein the first information of the first record member includes legends for the price information displayed by the electronic display.

4. The EPL as recited in claim 2, wherein the first information of the first record member includes a name of a store containing the EPL.

5. The EPL as recited in claim 1, wherein the first record member occupies substantially all of the front surface around the aperture.

6. The EPL as recited in claim 1, wherein the second information of the second record member includes product identification information for a product.

7. The EPL as recited in claim 6, wherein the product identification information includes a name of the product.

8. The EPL as recited in claim 6, wherein the product identification information includes a bar code label assigned to the product.

9. The EPL as recited in claim 6, wherein the product identification information includes an inventory number assigned to the product.

10. The EPL as recited in claim 6, wherein the second information of the second record member includes a promotional message.

11. The EPL as recited in claim 1, wherein the second record member occupies less of the front surface than the first record member.

12. The EPL as recited in claim 1, wherein the second record member is substantially rectangular in shape.

13. The EPL as recited in claim 1, wherein the second record member is located adjacent a side of the aperture.

14. The EPL as recited in claim 1, wherein the second record member includes a first portion which is substantially rectangular in shape and which is located adjacent a side of the aperture, and a second portion which is substantially rectangular in shape and which is located adjacent a top of the aperture.

15. The EPL as recited in claim 1, wherein the second record member is substantially L-shaped.

16. An overlay system for an electronic price label (EPL) comprising:

a first record member substantially permanently attached to a front surface of the electronic display using a first attachment device for displaying first information; and a second record member which removably attaches to the first record member using a second attachment device different than the first attachment device for displaying second information simultaneously with but different than the first information;

wherein the second record member leaves at least a portion of the first information of the first record member exposed when the second record member is attached to the first record member.

17. The overlay system as recited in claim 16, wherein the first information of the first record member includes substantially permanent information.

18. The overlay system as recited in claim 16, wherein the first information of the first record member includes legends for information displayed by the electronic display.

19. The overlay system as recited in claim 16, wherein the second information of the second record member includes product identification information for a product assigned to the EPL.

20. A method of changing information displayed by an electronic price label (EPL) comprising the steps of:

attaching a substantially permanent first overlay on a front surface of the EPL using a first attachment device, wherein the first overlay contains substantially permanent information;

attaching a removable second overlay containing product information to the first overlay using a second attachment device different than the first attachment device, including the substep of leaving at least a portion of the first information of the first record member exposed so that the second information is displayed simultaneously with the first information;

removing the second overlay from the first overlay when the information on the second overlay becomes incorrect; and attaching a removable third overlay to the first overlay in place of the second overlay using a second attachment device similar to the second attachment device, including the substep of leaving at least a portion of the first information of the first record member exposed so that the third information is displayed simultaneously with the first information, wherein the third overlay contains correct information.

21. The overlay system as recited in claim 16, wherein the first attachment device comprises an adhesive which is at least as strong as a semi-permanent adhesive.

22. The overlay system as recited in claim 16, wherein the second attachment device comprises a removable adhesive.

23. The overlay system as recited in claim 16, wherein the second attachment device comprises interlocking hooks and loops between the first and second record members.

* * * * *